Jan. 10, 1950 E. G. JOHNSON 2,493,971
BOBBER FOR FISHING LINES
Filed April 17, 1946 2 Sheets-Sheet 2
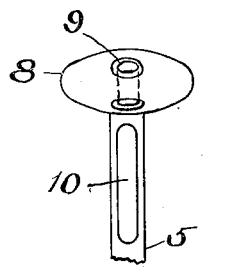
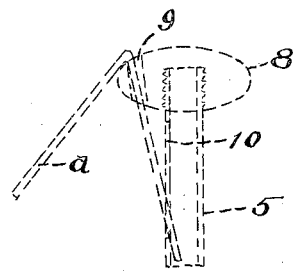
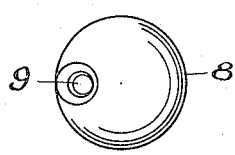
Fig. 7. Fig. 8.
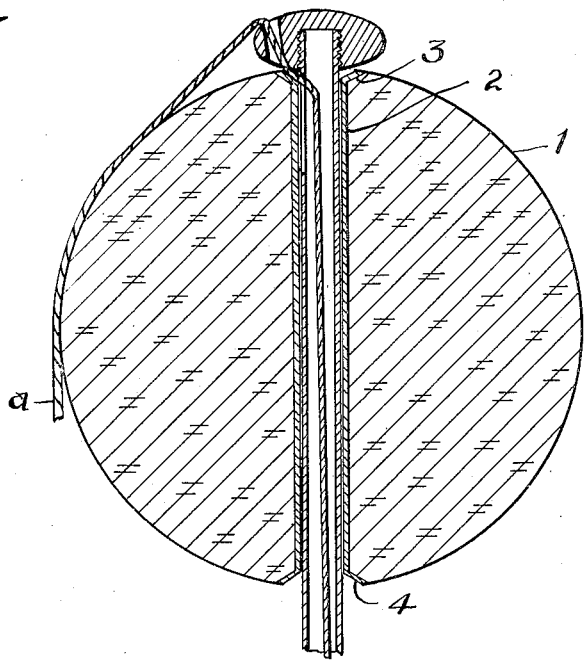
Fig. 5.
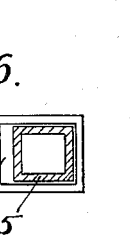
Fig. 6.
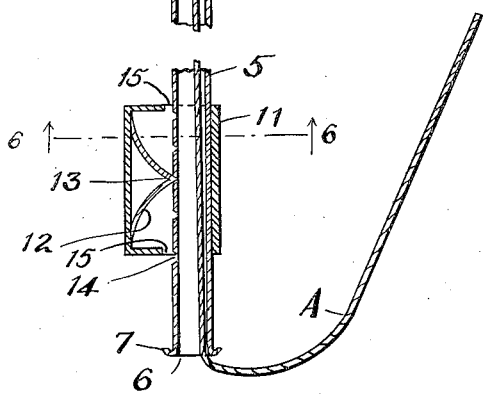
INVENTOR.
Elmer G. Johnson
BY
Munn, Liddy, Glaccum & Rich
Attys.

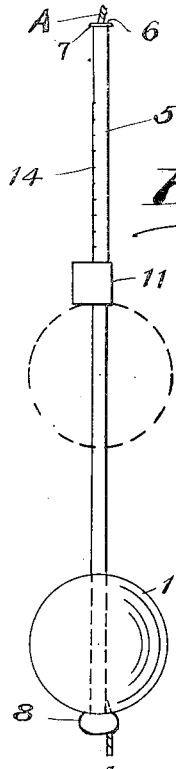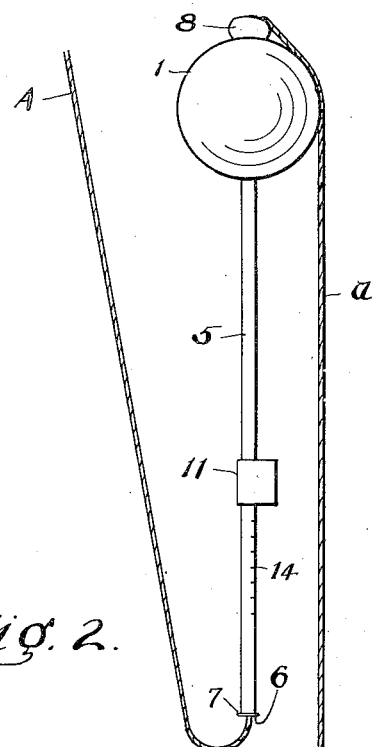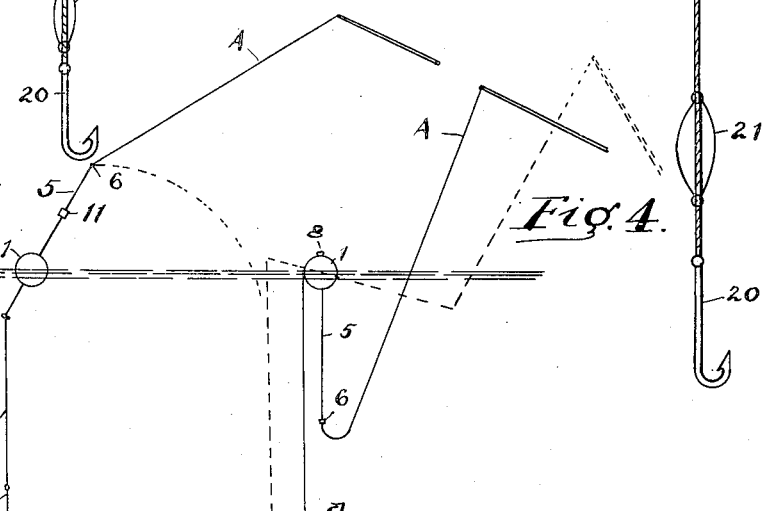

Patented Jan. 10, 1950

2,493,971

UNITED STATES PATENT OFFICE 2,493,971

BOBBER FOR FISHING LINES

Elmer G. Johnson, Hibbing, Minn.

Application April 17, 1946, Serial No. 662,828

5 Claims. (Cl. 43—49)

This invention relates to buoys or floats for use in connection with fishing lines. It is particularly intended as an adjunct to be used in still fishing either by rod and reel or with hand lines and the disclosure herein sets forth improvements on the construction of the reversible bobber described in my copending application Serial No. 635,485, filed December 17, 1945.

My present invention has for its object to provide a fishing line bobber which following a cast reverses itself from the position in which it strikes the water and adjustably holds the hook and sinker end of said line at any selected depth and which will be upturned when a strike occurs and a fish runs with the bait.

Another object of my invention is to provide a fish line bobber comprising a buoyant body having a central runner or line guide which is movable longitudinally in the body and carries a weighted member which is adjustable on the guide and acts as a counterweight to the hook, sinker and lure enabling a certain equilibrium to be maintained between the two ends of the fishing line thus adding to the sensitivity of the buoy under different fishing conditions.

My invention also comprehends an arrangement of parts permitting the operator to vary the depth at which the bait is suspended without the necessity of reeling in the line, changing the position of the bobber thereon and making another cast.

To these and other ends my invention embodies further improvements all of which will be fully described in the accompanying specification, the novel features thereof being set forth in the appended claims.

In the drawings:

Figure 1 is a side elevation of a bobber embodying my invention shown in suspended or casting position which may be one of the positions assumed as it strikes the surface of the water.

Figure 2 is a view of the device in fishing position being the reverse of that shown in Fig. 1.

Figures 3 and 4 are diagrammatic views similar to Figs. 1 and 2 respectively as an aid in illustrating the action of the bobber on the surface of the water under different manipulations of the fishing line.

Figure 5 is an enlarged central sectional view of the bobber in the fishing position of the parts.

Figure 6 is a transverse sectional view taken on the line 6—6 of Fig. 5.

Figure 7 is a detail side elevation of the line locking-head and

Figure 8 is a top plan view of said head.

Similar reference characters in the several figures indicate similar parts.

An understanding of the construction of the bobber embodying my invention will be an aid to the description of its operation. One of the parts which I utilize comprises a float 1 of cork or similar buoyant material, which is preferably spherical and has an axial core 2, angular in cross section, the ends 3 and 4 of which are splayed against the float to anchor the core and also protect the contiguous faces of the cork and provide abutments against which other parts of the apparatus may engage.

Guided for free longitudinal movements in the core is a tubular runner or slide rod 5 constituting a line guide. It has an open end 6 surrounded by a bead 7 and at its other end carries an oblate spheroid shaped head 8. The latter is perforated at one side, forming an eye as indicated at 9, extending in a diagonal direction as an offset continuation of a lateral opening 10 the rod directly below the head 8. On the opposite end of the rod between its beaded extremity and the body 1 is a slidable counterweight 11 which serves as a stop located in spaced relation to the head 8 by means of which the relative movement of the line guide or runner and the body 1 may be regulated for the purpose of maintaining equal sensitivity of the bobber as a whole under varying weighted conditions of the free end of the line. On occasion different weight sinkers may be placed above the hook, again the size of the lure or bait may vary, or the fisherman may develop a personal technique in his manipulation of the bobber by which feels he can best operate his line by a particular setting of the weight. To accomplish these several purposes I make the weight movable and construct it in the form of a box which contains a double leaf spring 12 having a central bearing point 13 which is adapted to engage indentations 14 in the contiguous face of the bar 5. The openings 15 in the ends of the box are somewhat larger than the cross section of the bar so that it may be moved transversely thereon to compress the spring 12 sufficiently to enable the position of the weight to be shifted as occasion may require.

A fish line A, as it leads from the end of the pole is threaded through the end 6 of the tubular rod (in a downward direction in Fig. 1, or upwardly in Fig. 4) and emerges from the aperture 10 whence it passes through the opening or eye 9 in the head 8. From this point on the free end a of the fishing line may be of any desired length and carry at its extremity a fish hook 20 and the usual sinker 21 located relatively thereto.

It will be seen that the line A will travel freely under the combined weight of the bait or lure and sinker when the rod 5 is in the position of Fig. 1 and that it will be locked frictionally when the rod is in the reverse position (Fig. 4) by reason of the engagement of the head 8 with the body 1, the offset of the eye 9 being such that it will press said line against the body 1 in the area of the flange 3 on the guide 2.

There are two alternative ways in which a cast may be effected in either of which the bobber is initially in the position shown in Fig. 1, i. e. with the float 1 in engagement with the head 8 on rod 5. The line A may be drawn through the rod 5 until the sinker 21 is in engagement with the head 8, or the free end a of the line may be extended to provide the requisite length for the desired fishing depth below the bobber. In preparation for either of such castings the line A will be frictionally held by engagement of the body 1 with the head 8. Consequently when the bobber hits the surface of the water the thin upwardly extending end of rod 5 will immediately topple over without the line being released so that the apparatus assumes the position shown in Figs. 2 and in full lines in Fig. 4 and so floats.

The member 11 is initially adjusted on rod 4 to act as a counterweight to the baited hook and sinker 14 so that a partial if not an even balance may be maintained with reference to the center of gravity of the float 1, and for the float and its line guide. Consequently it is a simple matter to release the grip of head 8 on line A by causing the rod 5 to be elevated as shown in dotted lines in Fig. 4, and by a rippling movement of the lines, imparted by the end of the fish pole, to cause the rod to creep lengthwise in the float. Such vibrations in line A may be used to either shorten the distance to its hook end or to lengthen it without creating any considerable displacement of said rod on the float. However, since the rod 5 has a limited amount of travel relatively to the float 1 for the distance represented by the full line position and the dotted line position of the float as shown in Fig. 1, it is also possible by the manipulation of line A to advance the rod sufficiently, as shown in dotted lines in the diagrammatic illustration Fig. 4, to permit the hook-sinker end a to draw the head 8 downwardly as illustrated in Fig. 3. In this position the line A may be paid out or retracted freely and when the desired fishing depth has been adjusted a quick retracting movement of the line, by reason of the friction created by the wetted line as it is drawn through the various parts of the line guide will retract the latter to the point where the weight thereof will cause it to again topple over and assume the position shown in Fig. 2.

Only when a fish takes the bait and starts to run a tension is placed on the hook end a of the line primarily which is imparted to the portion leading to the fish pole. This displaces the equilibrium of the parts to the point where the bar 5 will be drawn through the float 1 until arrested by the adjustable stop or counterweight 11. Since the line then runs freely through the bobber the operator may play his fish by feeding out the line if desired and when the fish indicates a state of exhaustion he may reel in the line until the sinker contacts the head 8.

A fisherman may manipulate his line in casting so as to cause the bobber to strike the water surface in the position shown in either Fig. 1 or Fig. 3. According to Fig. 1 the float 1 will then be in the dotted line position permitting the line A to be paid out freely to sink the baited hook, or lure, to the desired depth. At this point the bobber may be toppled over or reversed by a sidewise tug on the line, this action being aided by the counterbalance 11. It will be seen from Fig. 3 that the counterbalance also acts automatically when a cast results in placing the parts in the manner shown.

If desired the buoy may be painted in contrasting colors to designate different hemispherical portions to aid in the visual observation of its position on the surface of the water.

I claim as my invention:

1. A fishing line bobber comprising a buoyant body, a tube movable therethrough having a lateral opening and provided with a head engaging one side of the body when the tube is in one position of adjustment, said head having a perforation offset from the wall of the tube, and a member on the tube adjustable relatively to the tube and engaging the opposite side of the body when the position of the tube is reversed with respect to the body.

2. A bobber for a fishing line having its free end equipped with hook and lure, said bobber comprising a buoyant body, a tubular guide for the line, said line being movable longitudinally of the body and having a head engaging one side of the body limiting the movement of the tube in one direction and frictionally locking the line to maintain the hook end thereof at a selected fishing depth, and a stop member adjustable on the tube at the opposite side of the body in spaced relation thereto serving in certain relative positions of the tube and body as a counterweight to the hook end of the line.

3. A bobber for fishing lines comprising a tubular line guide open at one end and provided with a lateral opening at its other end and also having an enlarged head having a perforation receiving and guiding said line, a stop member adjustable on the tube in spaced relation to the head, and a buoyant body slidably carrying the tube and located between the head and said stop member and cooperating with the head in one position to lock the free end of the line to the body and in a second position cooperating with the stop to float the tube with its head end uppermost.

4. A bobber for fishing lines comprising a buoyant body, a tubular line guide polygonal in cross section movable longitudinally of the body and having an enlarged head limiting its movement in one direction by engagement with one side of the body, said head having a perforation forming a guide eye for one portion of the line, said tube having indentations on one of its faces at the opposite side of the body, and a stop member on the tube having means engaging said indentations for securing the stop member in any one of several selected positions in spaced relation to said head and serving to determine the movement of the body to the tubular line guide.

5. A combination of a tube, a float provided with a central opening, said tube being within the opening and extending beyond the ends of the opening and freely slidable therein, a weight mounted on a portion of the tube between a free end thereof and the float and adapted to be held in fixed relation thereto and spaced therefrom, and a head on the opposite end of the tube and in fixed relation thereto, the length of the space between the head and the weight being always greater than the length of the opening within the float, whereby the tube is capable of free sliding movement relative to the float and gravitational movement relative to the float when the weight is located therebelow, said head constituting a stop when the weight is in the latter position, said head being provided with an opening and said tube being provided with a passageway adjacent the head opening for the passage of a line therethrough.

ELMER G. JOHNSON.

REFERENCES CITED

The following references are of record in the file of this patent:

UNITED STATES PATENTS

| Number | Name | Date |
|---|---|---|
| 332,573 | Tufts | Dec. 15, 1885 |
| 1,371,170 | Johnson | Mar. 8, 1921 |
| 1,418,944 | Lower | June 6, 1922 |
| 2,223,823 | Hampton | Dec. 3, 1940 |

FOREIGN PATENTS

| Number | Country | Date |
|---|---|---|
| 738,506 | France | Oct. 17, 1932 |